US009730277B2

(12) United States Patent
Steltzlen et al.

(10) Patent No.: US 9,730,277 B2
(45) Date of Patent: Aug. 8, 2017

(54) PRESSURIZER HEATER FOR THE PRIMARY COOLING SYSTEM OF A PRESSURIZED-WATER NUCLEAR REACTOR

(75) Inventors: Françoise Steltzlen, Chatou (FR); Marc Foucault, Le Creusot (FR); Yves Meyzaud, Saint Jouin (FR); Peter Scott, Noisy le Roi (FR)

(73) Assignee: AREVA NP, Courbevoie (FR)

( * ) Notice: Subject to any disclaimer, the term of this patent is extended or adjusted under 35 U.S.C. 154(b) by 1556 days.

(21) Appl. No.: 12/097,170

(22) PCT Filed: Dec. 12, 2006

(86) PCT No.: PCT/FR2006/002711
§ 371 (c)(1),
(2), (4) Date: Jul. 17, 2008

(87) PCT Pub. No.: WO2007/068821
PCT Pub. Date: Jun. 21, 2007

(65) Prior Publication Data
US 2008/0310578 A1    Dec. 18, 2008

(30) Foreign Application Priority Data
Dec. 16, 2005 (FR) ...................................... 05 12853

(51) Int. Cl.
*G21C 9/00* (2006.01)
*H05B 3/82* (2006.01)
(Continued)

(52) U.S. Cl.
CPC .................. *H05B 3/82* (2013.01); *C25D 3/12* (2013.01); *C25D 5/36* (2013.01); *C25D 7/04* (2013.01); *G21C 1/09* (2013.01); *Y02E 30/40* (2013.01)

(58) Field of Classification Search
CPC ... C25D 3/02; C25D 3/12; C25D 7/04; C25D 5/26; C25D 5/36; G21C 1/08; G21C 1/09;
(Continued)

(56) References Cited

U.S. PATENT DOCUMENTS 2,515,781 A * 7/1950 Lennox ........................ 338/241
3,111,572 A   11/1963 Drugmand et al.
(Continued)

FOREIGN PATENT DOCUMENTS

CA    2236933 A1    12/1998
CN    1405360       3/2003
(Continued)

OTHER PUBLICATIONS

Dennis et al., Nickel and Chromium Plating, 1993, Woodhead Publishing Limited, Third edition, pp. 41, 42, 294, 295, 298.*
(Continued)

*Primary Examiner* — Marshall O'Connor
(74) *Attorney, Agent, or Firm* — Davidson, Davidson & Kappel, LLC

(57) ABSTRACT

The invention relates to a heating rod for a pressurizer of a primary cooling system of a pressurized-water nuclear reactor, the rod comprising a metal outer shell (36) of longitudinally elongate shape having an external surface (62), and a heating element (40) mounted inside the shell (36). It comprises an anti-corrosion coating (60) covering at least part of the external surface (62) of the shell (36).

9 Claims, 4 Drawing Sheets

(51) Int. Cl.

| | | |
|---|---|---|
| *C25D 3/12* | (2006.01) | |
| *C25D 5/36* | (2006.01) | |
| *C25D 7/04* | (2006.01) | |
| *G21C 1/09* | (2006.01) | |

(58) Field of Classification Search
CPC .... G21C 1/322; G21C 3/20; G21Y 2002/103; G21Y 2002/104; G21Y 2002/207; G21Y 2002/303; G21Y 2004/10; G21Y 2004/30; H05B 3/48; H05B 3/82; Y02E 30/40
USPC ......... 376/416, 277, 307, 305, 414; 205/80, 205/213, 236; 427/430.1, 435, 436, 437, 427/438, 123, 328, 405; 29/611; 392/501, 503; 219/534, 544; 420/54, 56
See application file for complete search history.

(56) References Cited

U.S. PATENT DOCUMENTS

| | | | |
|---|---|---|---|
| 3,310,769 A | | 3/1967 | Simmons et al. |
| 3,455,014 A | | 7/1969 | Beyer et al. |
| 3,616,280 A | * | 10/1971 | Arnold .......................... 205/236 |
| 3,859,721 A | * | 1/1975 | Cunningham et al. ......... 29/611 |
| 3,977,073 A | * | 8/1976 | Shirey .............................. 29/611 |
| 4,135,552 A | * | 1/1979 | Mendolia ........................ 138/30 |
| 4,470,947 A | * | 9/1984 | McCarthy et al. ............ 376/213 |
| 4,689,198 A | * | 8/1987 | Fujiwara et al. ................ 420/47 |
| 4,808,371 A | * | 2/1989 | Taniuchi et al. ................ 420/54 |
| 5,091,140 A | | 2/1992 | Dixon et al. |
| 5,094,801 A | * | 3/1992 | Dixon et al. .................. 376/307 |
| 5,139,732 A | * | 8/1992 | Godin .......................... 376/260 |
| 5,196,160 A | | 3/1993 | Porowski |
| 6,028,294 A | * | 2/2000 | Nilson .......................... 219/523 |
| 6,414,281 B1 | * | 7/2002 | Long et al. .................... 219/478 |
| 6,456,785 B1 | * | 9/2002 | Evans ........................... 392/488 |
| 2002/0136344 A1 | | 9/2002 | Nakamura et al. |
| 2005/0034755 A1 | * | 2/2005 | Okada et al. ................. 136/256 |

FOREIGN PATENT DOCUMENTS

| | | | | |
|---|---|---|---|---|
| CN | 1447625 | | 10/2003 | |
| GB | 1010607 | | 12/1911 | |
| GB | 821098 | * | 9/1959 | |
| GB | 1128819 | | 10/1968 | |
| GB | 2319950 | | 6/1998 | |
| JP | 54-076440 | * | 6/1979 | ............... C25F 3/00 |
| JP | 60-262994 | * | 12/1985 | ............... C25D 5/26 |
| JP | 60262994 A | * | 12/1985 | |
| JP | 61087896 | | 5/1986 | |
| JP | 61087896 A | * | 5/1986 | ............... C25D 3/12 |
| JP | 63-121641 | * | 5/1988 | ............. C22C 38/52 |
| JP | H0765936 A | | 3/1995 | |
| JP | H07232501 | | 9/1995 | |
| JP | 09-014573 | * | 1/1997 | ............. F16L 58/18 |
| JP | H1171695 A | | 3/1999 | |
| JP | 2001124891 A | | 5/2001 | |
| JP | 2002040190 A | | 2/2002 | |

OTHER PUBLICATIONS

Ramqvist, Lars, et. al, Process for Improving the Anti Corrosion Properties of Steel Coated with Nickel or Cobalt, Canadian Patent No. 1038245, Issue Date Aug. 12, 1978.*

* cited by examiner

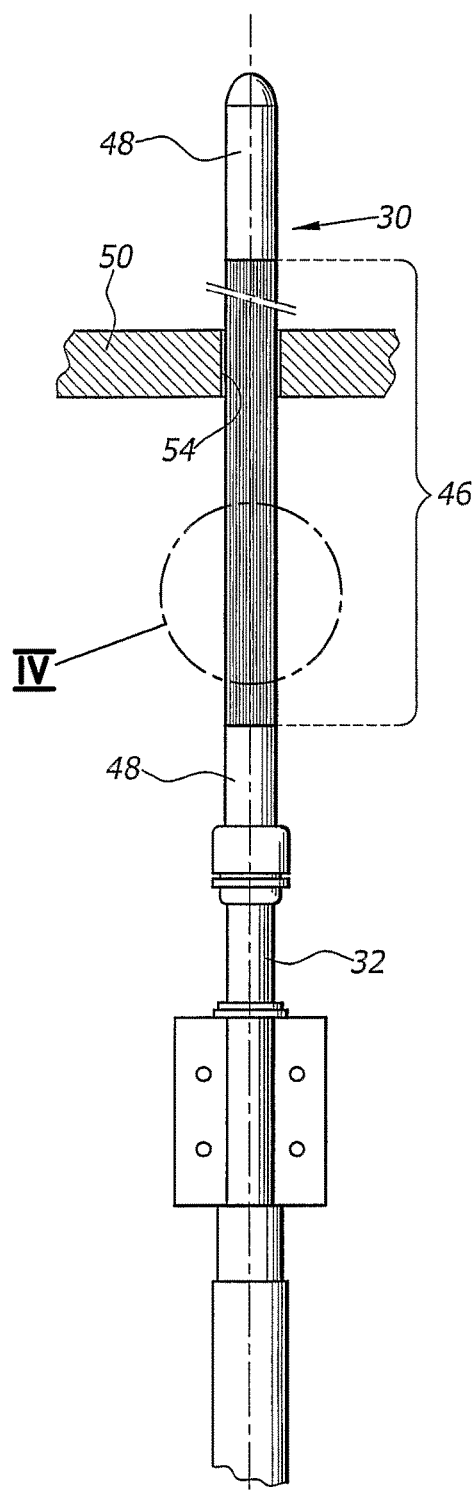
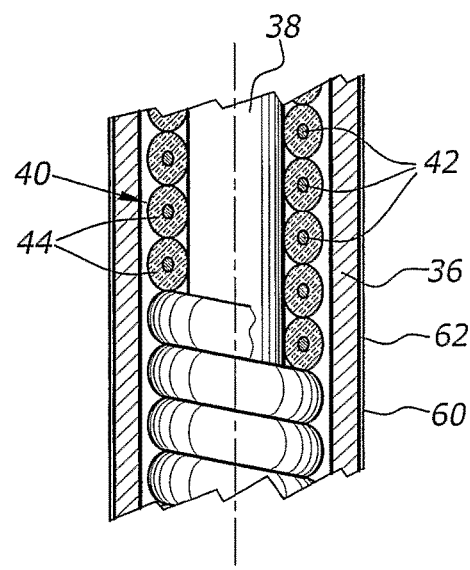
FIG.3
FIG.4

PRESSURIZER HEATER FOR THE PRIMARY COOLING SYSTEM OF A PRESSURIZED-WATER NUCLEAR REACTOR

CROSS REFERENCE TO RELATED APPLICATIONS

This application is a National Phase filing under 35 U.S.C. §371 of PCT/FR2006/002711filed Dec. 12, 2006, which claims priority to Patent Application No. 05 12853, filed in France on Dec. 16, 2005. The entire contents of each of the above-applications are incorporated herein by reference.

The invention relates generally to heating rods for a pressurizer of a primary cooling system of a pressurized-water nuclear reactor.

More precisely, the invention relates, according to a first aspect, to a heating rod for a pressurizer of a primary cooling system of a pressurized-water nuclear reactor, of the type comprising a metal outer shell of longitudinally elongate shape having an external surface, and a heating element mounted inside the shell.

Such rods are normally mounted in the lower part of the pressurizer and are immersed in the water of the primary cooling system with which the pressurizer is partially filled. The rods are set into operation when it is desired to increase the operating pressure of the primary cooling system of the reactor. They heat the water to its boiling point so that part thereof evaporates.

Leaks have been found to occur on the heating rods of the prior art. The outer shell of one of the rods sometimes cracks, so that the inside of the rod communicates with the water inside the pressurizer.

Such a leak can result in damage to the heating element of the rod, the loss of operation of the rod, and even the leakage of pressurized water to the outside of the pressurizer, through the interior space of the rod.

Within this context, the invention aims to propose heating rods having improved reliability.

To that end, the invention relates to a heating rod of the type described above, characterized in that it comprises an anti-corrosion coating which covers at least part of the external surface of the shell.

The rod can also have one or more of the following characteristics, considered individually or according to all technically possible combinations:
the coating predominantly comprises nickel;
the coating comprises at least 95% by weight nickel;
the coating has been deposited on the external surface by electrolysis in a bath of nickel salts;
the coating has a thickness greater than 50 micrometers;
the rod comprises an active heating zone, the coating extending longitudinally at least along the whole of the active heating zone;
the coating continues longitudinally on each side of the active heating zone over a guard distance;
the guard distance is greater than 10 millimeters; and
the shell is made of austenitic stainless steel.

According to a second aspect, the invention relates to a method of treating a metal shell for a heating rod of the above type, characterized in that it comprises a step of depositing the coating on at least part of the external surface of the shell in an electrolytic cell comprising a bath and an electrode immersed in the bath, the bath predominantly comprising nickel sulfamate, nickel chloride and boric acid, the shell being disposed in the bath and an electric current being maintained between the electrode and the shell.

The method can also have one or more of the following characteristics, considered individually or according to all technically possible combinations:
the pH of the bath is maintained between 3 and 5 during the deposition step;
the electrode is made of soluble nickel;
the electric current is maintained at a current density between 5 and 50 amperes per square decimeter of the external surface of the shell that is to be treated during the deposition step;
the step of depositing the coating is preceded by a preliminary step of depositing an adhesion layer on at least part of the external surface of the shell in an electrolytic cell comprising a bath and an electrode immersed in the bath, the bath being a Watts bath predominantly comprising nickel sulfate, nickel chloride and boric acid, the shell being disposed in the bath and an electric current being maintained between the electrode and the shell;
the pH of the bath is maintained between 3 and 5 during the preliminary step; and
the adhesion layer has a thickness less than 10 micrometers.

Other characteristics and advantages of the invention will become apparent from the description thereof which is given hereinbelow by way of example and without implying any limitation, with reference to the accompanying figures, in which:

FIG. 3 is an enlarged view of an upper part of a heating rod of the pressurizer of FIGS. 1 and 2;

FIG. 4 is an enlarged partial view of part IV of the rod of FIG. 3, viewed in section in a longitudinal plane of the rod.

Figure 1:
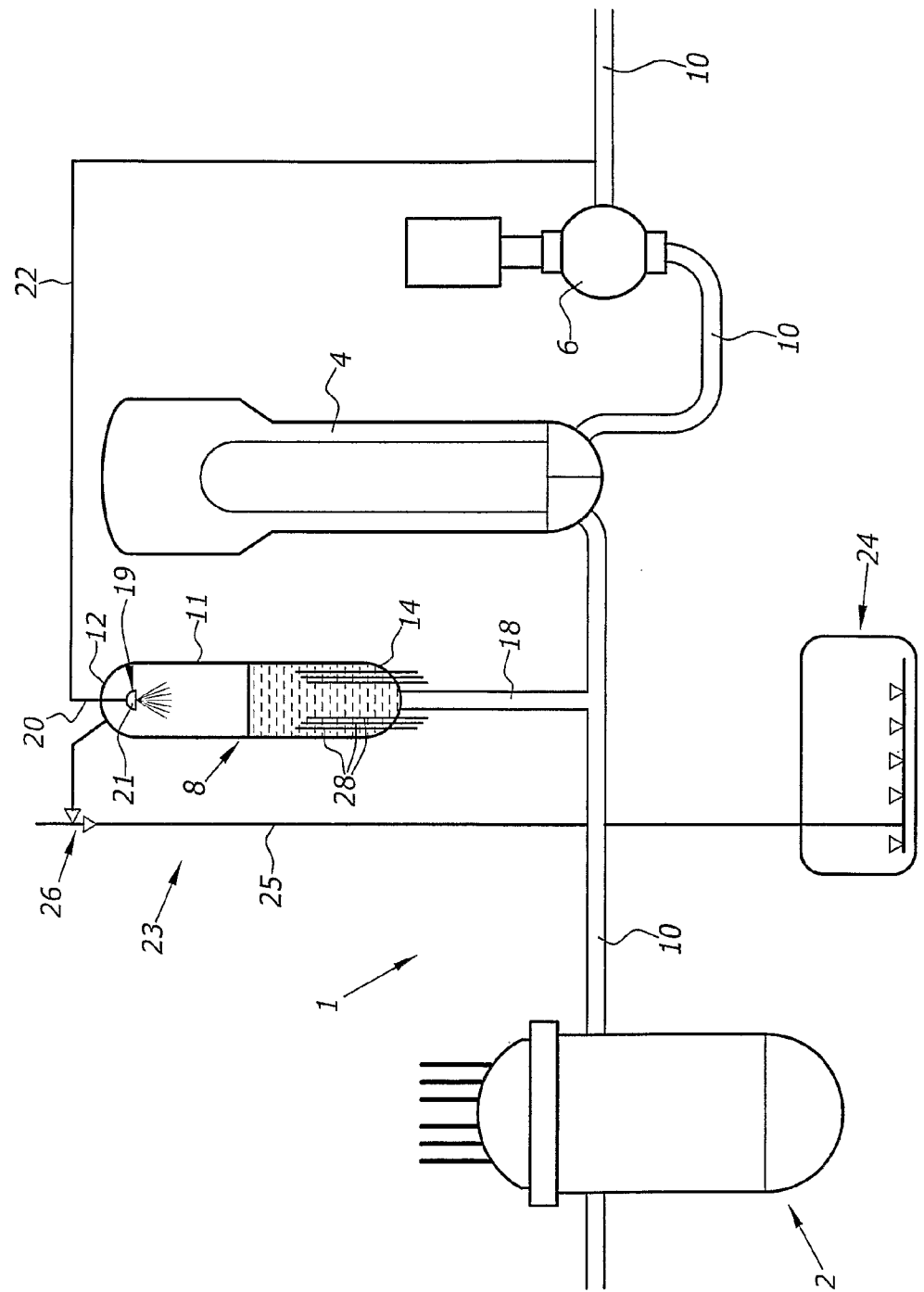
FIG. 1 is a simplified representation, in diagrammatic form, of the primary cooling system of a pressurized-water nuclear reactor, comprising a pressurizer equipped with heating rods according to the invention.

FIG. 1 shows a primary cooling system 1 of a pressurized-water nuclear reactor. The system 1 comprises a vessel 2 in which there are located nuclear fuel assemblies, a steam generator 4 having primary and secondary parts, a primary pump 6 and a pressurizer 8. The vessel 2, the steam generator 4 and the pump 6 are connected by sections of primary piping 10. The system 1 contains primary water, the water being pumped by the pump 6 towards the vessel 2, passing through the vessel 2 while being heated in contact with the fuel assemblies, and then passing through the primary part of the steam generator 4 before returning to the inlet side of the pump 6. The primary water heated in the vessel 2 gives up its heat in the steam generator 4 to secondary water which passes through the secondary part of the generator. The secondary water circulates in a closed loop in a secondary cooling system (not shown). It evaporates as it passes through the generator 4, the steam so produced driving a steam turbine.

The pressurizer 8 is mounted as a branch on the primary piping by way of a conduit 18 branched on the section 10 connecting the vessel 2 to the generator 4. It is disposed at a higher elevation than the pump 6 and the vessel 2. The pressurizer 8 comprises a substantially cylindrical fabricated shell 11 which has a vertical axis and is provided with a dome 12 and a bottom 14. The bottom 14 comprises a central orifice 16 (FIG. 2) which is connected to the primary piping by the conduit 18.

The pressurizer 8 also comprises spraying means 19 having a branch connection 20 which passes through the dome 12, a spray nozzle 21 disposed inside the shell 11 and mounted on the branch connection 20, a pipe 22 connecting the branch connection 20 to the primary piping, in the region of the outlet side of the pump 6, and means (not shown) for selectively allowing or preventing the flow of primary water in the pipe 22 to the nozzle 21.

The primary cooling system 1 also comprises a safety circuit 23 comprising an overflow tank 24, a pipe 25 connecting the tank 24 to the dome 12 of the pressurizer, and a safety valve 26 interposed on the pipe 25 between the tank 24 and the pressurizer 8.

The interior space of the pressurizer 8 communicates with the primary cooling system 1 so that the pressurizer 8 is permanently partially filled with primary water, the level of water inside the pressurizer being dependent on the current operating pressure of the primary cooling system. The top of the pressurizer 8 is filled with steam at a pressure substantially equal to the pressure of the water circulating in the primary piping 10 connecting the generator 4.

In case of excess pressure in the pressurizer, the valve 26 opens and the steam is evacuated to the tank 24, in which it condenses.

The pressurizer 8 is equipped with several tens of electric heating rods 28. The rods are disposed vertically and are mounted on the bottom 14. They pass through the bottom 14 by way of orifices provided for that purpose, sealing means being interposed between the rods and the bottom 14.

The rods 28 have a great length, typically from 1 m to 2.50 m, and a small cross-section in relation to their length.

Each rod 28 comprises a portion 30 (FIG. 2) that is disposed inside the shell 11 of the pressurizer and is immersed in the water with which the pressurizer is partially filled, an intermediate portion 32 that is mounted in an orifice in the base 14, and a connection portion 34 that is disposed outside the shell 11.

As is shown in FIG. 4, the immersed portion 30 comprises an outer shell 36 of cylindrical shape which is made of stainless steel or alloy, generally a central mandrel 38 disposed inside the shell 36 according to the central axis thereof, and a heating wire 40 which is wound around the mandrel 38 in a spiral and is interposed between the mandrel 38 and the shell 36.

The heating wire 40 comprises an electrically conductive resistive metal core 42, for example made of copper or of nickel-chromium alloy, and a metal sheath made of steel 44 which surrounds the core 42 and is insulated electrically by magnesium oxide. It is in contact with an internal face of the shell 36.

The wire 40 is disposed so as to create, in the immersed portion 30, a central longitudinal heating zone 46 (FIG. 2) and two longitudinal non-heating zones 48 disposed on each side of the heating zone 46.

In the heating zone 46, the mandrel 38 is made of copper and the wire 40 is wound around the mandrel 38 to form contiguous turns.

The wire 40 extends along the intermediate portion 32, on the inside thereof, and is connected to an electrical connector 49 situated in the portion 34. The connector 49 is electrically connected to an electric generator (not shown), which is capable of causing an electric current to flow in the wire 40.

The immersed portion 30 has a longitudinal length of 2150 mm, for example. The heating zone 46 has a longitudinal length of 1100 mm, for example. The non-heating zone 48 interposed between the zone 46 and the intermediate portion 32 has a longitudinal length of 450 mm, for example. The non-heating zone 48 situated on the other side of the heating zone 46 has a longitudinal length of approximately 550 mm. The diameter of the outer shell 36 is constant along the whole of the portion 30 and is, for example, 22 mm. The portions 32 and 34 have a longitudinal length of 340 mm, for example, in total.

The electrical power of each rod 28 varies from 6 to 30 kW. It delivers a heat flow which varies between 20 and 50 W/cm$^2$, considered in the region of the external surface of the shell 36.

Figure 2:
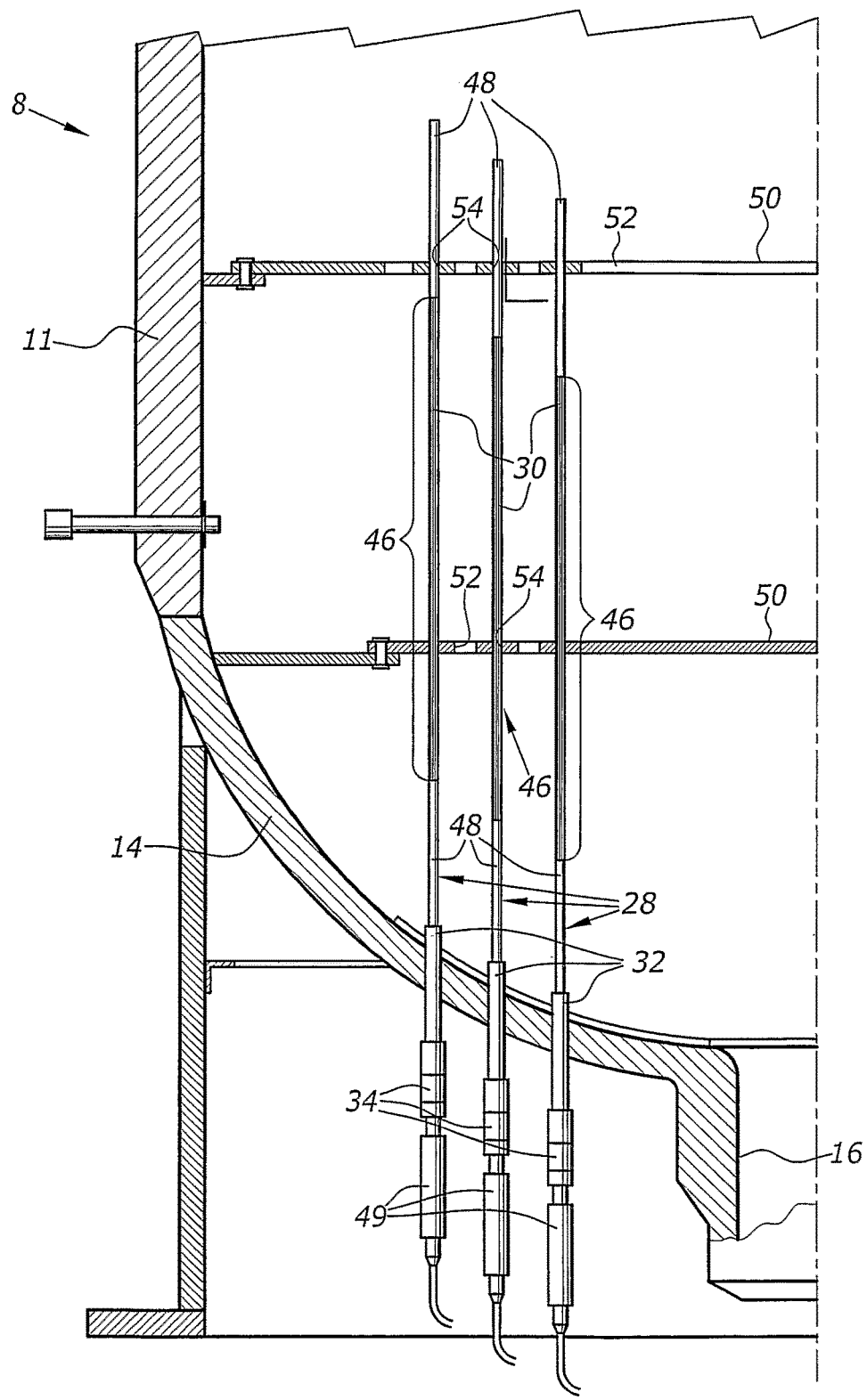
FIG. 2 is a cutaway view, in a vertical plane, of a lower part of the pressurizer of FIG. 1.

The pressurizer 8 further comprises guide plates 50 for holding the rods 28, shown in FIG. 2. The guide plates 50 extend substantially horizontally over the whole of the internal section of the pressurizer 8. They are disposed one above the other, at different vertical levels in the pressurizer 8. Each guide plate comprises slots 52 permitting the flow of water through the plates 50, and holes 54 for guiding the rods 28.

The holes 54 are circular and have a diameter slightly greater than the outside diameter of the immersed portion 30 of the rods (FIG. 3). The portion 30 passes through the various plates 50 through superposed holes 54, so that the rods 28 are guided at several levels and are maintained in a substantially vertical orientation by the plates 50. The outer shell 36 of the rod is not normally in contact with the edges of the holes 54.

The function of the pressurizer 8 is to control the pressure of the water in the primary cooling system. Because it communicates with the primary piping by way of the pipe 18, it acts as an expansion vessel. Thus, when the volume of water circulating in the primary cooling system increases or decreases, the level of water inside the pressurizer 8 will rise or fall accordingly.

That variation in the volume of water can be the result, for example, of an injection of water into the primary cooling system or of a variation in the operating temperature of the primary cooling system.

The pressurizer 8 also serves to increase or decrease the operating pressure of the primary cooling system.

In order to increase the operating pressure of the primary cooling system, the heating rods 28 are supplied with power so that they heat the water contained in the lower part of the pressurizer and bring it to its boiling point. Some of the water boils, so that the pressure in the top of the pressurizer 8 increases. Because the steam is constantly in hydrostatic equilibrium with the water circulating in the primary cooling system 1, the operating pressure of the primary cooling system 1 increases.

In order to lower the operating pressure of the primary cooling system 1, the spraying nozzle 21 disposed in the top of the pressurizer 8 is set into operation by allowing the flow of water in the pipe 22 with the aid of the means provided for that purpose. The water withdrawn in the primary piping 10 on the outlet side of the pump 6 is discharged into the top of the pressurizer 8 and causes some of the steam therein to condense. The pressure of the steam in the top of the pressurizer 8 falls, so that the operating pressure of the primary cooling system 1 also decreases.

As is shown in FIG. 4, the heating rods 28 each comprise an anti-corrosion coating 60 which covers at least part of the external surface 62 of the shell 36. The coating 60 extends longitudinally over the whole of the heating zone 46 of the rod, and it also extends longitudinally on each side of the zone 46 over a guard distance. The guard distance is greater than 10 mm, preferably greater than 30 mm, and is typically of the order of from 50 mm to 100 mm.

The coating 60 extends over the whole of the periphery of the outer shell 36, so that it covers the shell 36 completely in the heating zone 46 and in part of the zones 48, over the guard distance.

The coating 60 predominantly comprises nickel, and it preferably comprises at least 95% by weight nickel. In a preferred embodiment, the coating is a coating of pure or virtually pure nickel which is deposited electrolytically, as explained hereinbelow.

The coating 60 has a thickness greater than 50 µm and less than 200 µm. Preferably, it has a thickness of approximately 100 µm.

The method of depositing the coating 60 on the surface 62 of the outer shell will now be described.

Figure 5:
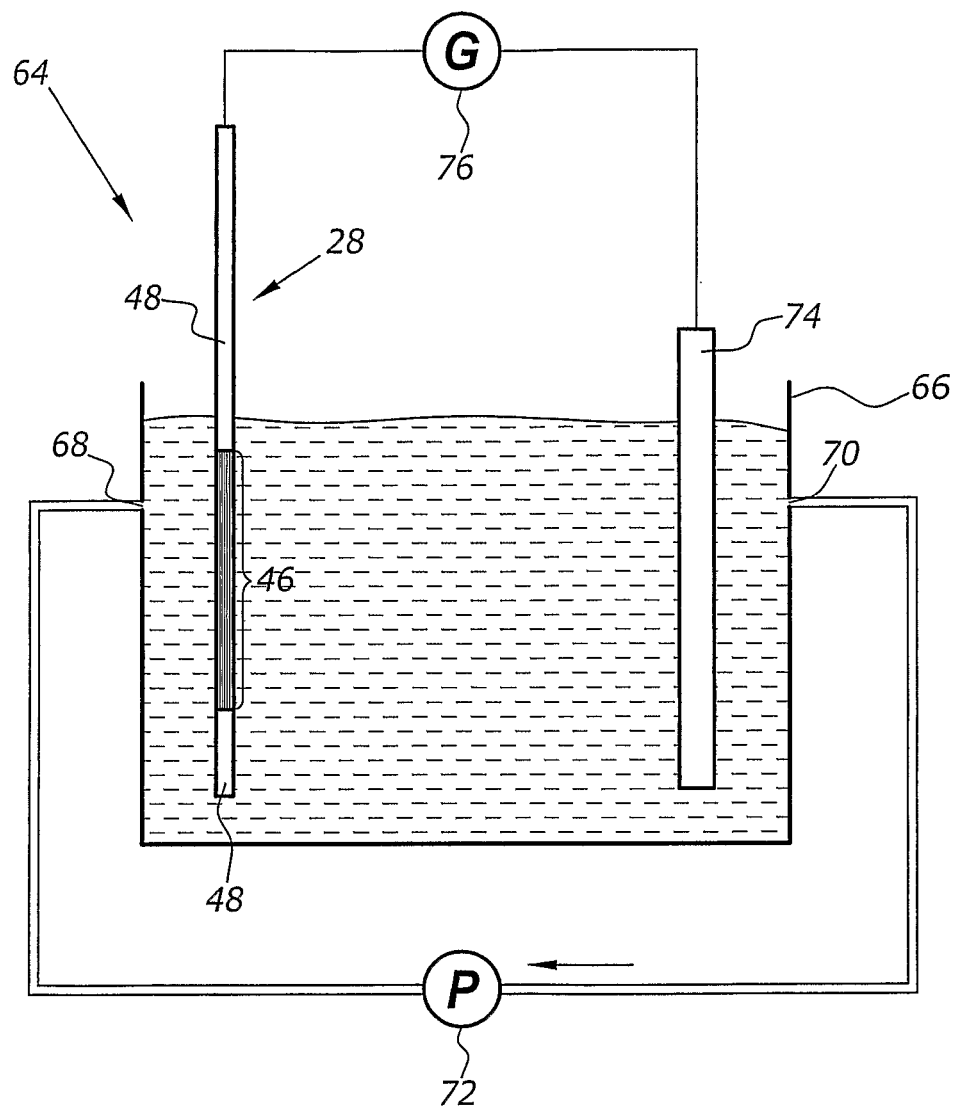
FIG. 5 is a simplified representation, in diagrammatic form, of an electrolytic cell suitable for depositing the anti-corrosion coating on the rods of FIGS. 1 to 4.

The main steps of the method are carried out in an electrolytic cell of the type shown in FIG. 5. The cell 64 comprises a vessel 66, which can contain a treatment bath and is provided with an inlet 68 and an outlet 70, a pump 72 for circulating the liquid that forms the bath from the outlet 70 to the inlet 68 of the vessel, an electrode 74 immersed in the bath, and an electric generator 76. The electrode 74 is made of soluble nickel. The electric generator 76 can be connected electrically on the one hand to the electrode 74 and on the other hand to the rod 28 that is to be treated. It is suitable for maintaining a potential difference between the electrode 74 and the rod 28 that is to be treated.

The treatment method comprises the following successive steps.

Step 1—Provision of a heating rod 28 to be treated. The rod is equipped with all its internal equipment (core 38, heating wire 40).

Step 2—Degreasing of the external surface 62 of the shell 36.

Step 3—Pickling of the surface to be coated using sulfuric acid.

Step 4—Reversed polarity strike in order to dissolve the surface layer of the surface to be coated. This step can be carried out in the cell 64. In that case, the cell 64 is filled with a suitable solution, the immersed portion 30 of the rod being immersed in the solution, and the electric generator 76 being mounted so as to maintain the shell 36 at a positive potential and the electrode 74 at a negative potential. At the end of this step, the original surface layer of the shell 36 has been dissolved and has been replaced by a new surface covered with a freshly formed passive film.

Step 5—Normal polarity strike, so as to depassivate the surface to be coated. This step can be carried out in the electrolytic cell 64. In that case, the cell 64 is filled with a suitable electrolyte bath, the portion 30 of the rod being immersed in the bath, as above. The generator 76 is this time mounted so as to maintain the shell 36 at a negative potential and the electrode 74 at a positive potential. This step allows the passive film formed in the preceding step 4 to be removed and the metal of the shell 36 to be exposed in order to permit better adhesion of the coating 60.

Step 6—Deposition of an adhesion layer. The adhesion layer forms part of the coating 60 and comprises virtually no nickel. It has a thickness less than 10 µm, preferably of 2 µm. During this step, the vessel 66 is filled with a highly acidic Watts bath, which is composed principally of nickel sulfate, nickel chloride and boric acid. The pH of the solution is maintained between 3 and 5. The electric generator 76 maintains the electrode 74 at a positive potential and the shell 36 at a negative potential. The pump 72 serves to recirculate the bath continuously during step 6, a flow of liquid being withdrawn from the vessel 66 through the outlet 70 and reinjected through the inlet 68.

Step 7—Deposition of the actual coating 60, the adhesion layer also forming part of the coating 60. The deposition is carried out in the cell 64. The vessel 66 is filled with a sulfamate bath substantially comprising nickel sulfamate, nickel chloride and boric acid. The pH of the bath is maintained between 3 and 5 during this step, preferably at approximately 4.5. The electric generator 76 maintains the electrode 74 at a positive potential and the shell 36 at a negative potential. An electric current is thus maintained between the electrode 74 and the shell 36 of the rod, the current density being from 5 to 50 amperes/dm$^2$ of the external surface of the shell to be treated. Preferably, the current density is of the order of 20 amperes/dm$^2$. The nickel layer deposited during step 7 has a thickness of the order of 100 µm.

During steps 3 to 7, the parts of the external surface 62 of the rod that are not to receive the coating are protected by a suitable protective layer, for example an organic varnish.

The heating rods and the treatment method described hereinbefore have numerous advantages.

The coating 60 that covers part of the external surface of the shell 36 allows the rods to be protected against corrosion and the operating performance of the rods to be improved.

The inventors have in fact found that, under certain operating conditions, a caustic medium develops between the heating zone 46 of the rod and the guide plates 50, and more precisely between the zone 46 and the edges of the holes 54. That gap constitutes a confined space in which the water does not circulate much and is replaced slowly, so that overheating with boiling can occur in that space, causing the creation of a caustic medium.

The coating 60 makes it possible to prevent stress corrosion of the shell 36 from developing, in particular in the region of the plates 50, which can cause the shell 36 to crack and the inside of the rod 28 to communicate with the primary water. The reliability of the rods 28 is thus improved.

The electrolytic nickel coating chosen in the above-mentioned example for partially covering the shells of the rods is particularly suitable because:
  it is compatible with the stainless steel constituting the shells 36 of the heating rods;
  it is permitted in the primary cooling system owing to its high purity;
  it is resistant to corrosion under the characteristic operating conditions of the pressurizer (chemical composition of the primary water, temperature, pressure); and
  it is resistant to stress corrosion in the nominal primary medium.

The use of an electrode 74 made of soluble nickel in the cell 64 used to deposit the coating 60 is particularly suitable because it allows the composition of the bath to be kept virtually constant during phases 6 and 7 and consequently ensures that the nickel quality is constant and reproducible throughout the nickel-coating operation.

In addition, all the steps of the method are carried out at temperatures far below the melting point of copper, typically 60° C. There is therefore no risk of damage to the electrical part of the rod (copper wire) during the operation of depositing the nickel, and therefore no risk of causing electrical failures as a result.

The coating 60 is resistant to corrosion, including in a situation of thermal testing of the primary cooling system of the reactor or in a cycle extension situation, it being possible for a basic medium to develop in the pressurizer in both those situations. A cycle extension situation corresponds to prolonged use of the nuclear reactor between two cold shutdowns for the unloading of some fuel assemblies.

The geometry of the heating rods is virtually unchanged compared with the prior art. In order to obtain exactly the same outside diameter for the immersed portion 30, it is possible to remove a layer of approximately 100 μm from the outer shell by grinding, before the electrolytic coating is deposited.

The heating rods 28 and the treatment method described hereinbefore can have numerous variants.

The coating 60 can cover the whole of the immersed portion 30, not only the zone 46 but also the zones 48 disposed on each side of the zone 46.

It is possible to use a material other than nickel for the coating 60. That material can be, for example, chromium, or a more noble material than nickel, such as platinum or gold.

The rod 28 can comprise an internal part that is different from that described hereinbefore (mandrel 38, heating wire 40).

The outer shell 36 of the rod 28 can be made not of austenitic stainless steel but of Inconel 690, for example.

The heating rods can have dimensions other than those mentioned hereinbefore (total length of the portion 30, outside diameter, length of the heating zone 46, of the non-heating zones 48, etc.).

The invention claimed is:

1. A heating rod in a pressurizer of a primary cooling system of a pressurized-water nuclear reactor, the pressurizer containing a primary liquid, the heating rod comprising:
   an outer shell made of stainless steel or alloy of longitudinally elongate shape having an external surface, wherein the external surface continues as one piece;
   a heating element mounted inside the outer shell so that an immersed portion of the rod has a heating longitudinal section and non-heating longitudinal sections located both above and below the heating longitudinal section; and
   an anti-corrosion coating covering a part of the external surface of the outer shell, the coating covering completely the external surface along the whole of the heating longitudinal section and continuing longitudinally on each side of the heating longitudinal section over a guard zone distance along the non heating longitudinal sections, other areas of the external surface along the non heating longitudinal sections zone being non coated by the anti-corrosion coating;
   such that the external surface is not in contact with the primary liquid along the heating longitudinal section and is partially in contact with the primary liquid along the non heating longitudinal sections;
   wherein the coating predominantly comprises nickel.

2. The rod according to claim 1, wherein the coating comprises at least 95% by weight nickel.

3. The rod according to claim 1, wherein the coating has been deposited on the external surface by electrolysis in a bath of nickel salts.

4. The rod according to claim 1, wherein the coating has a thickness greater than 50 micrometers.

5. The rod according to claim 1, wherein the guard zone distance is greater than 10 millimeters.

6. The rod according to claim 1, wherein the outer shell is made of austenitic stainless steel.

7. The heating rod to claim 1, wherein the outer shell is tubular.

8. The heating rod to claim 1, wherein the heating element is enclosed in the outer shell.

9. The heating rod to claim 1, wherein the outer shell is the most exterior element of the heating rod.

* * * * *